US008839857B2

(12) United States Patent
Schultz et al.

(10) Patent No.: US 8,839,857 B2
(45) Date of Patent: Sep. 23, 2014

(54) GEOTHERMAL ENERGY PRODUCTION

(75) Inventors: Roger L. Schultz, Ninnekah, OK (US);
Travis W. Cavender, Angleton, TX (US)

(73) Assignee: Halliburton Energy Services, Inc.,
Houston, TX (US)

( * ) Notice: Subject to any disclaimer, the term of this patent is extended or adjusted under 35 U.S.C. 154(b) by 439 days.

(21) Appl. No.: 12/967,126

(22) Filed: Dec. 14, 2010

(65) Prior Publication Data
US 2012/0145397 A1 Jun. 14, 2012

(51) Int. Cl.
*E21B 43/12* (2006.01)
*E21B 43/24* (2006.01)
*E21B 43/00* (2006.01)
*E21B 34/00* (2006.01)
*E21B 43/32* (2006.01)
*E21B 43/14* (2006.01)
*F24J 3/08* (2006.01)
*E21B 34/08* (2006.01)

(52) U.S. Cl.
CPC .......... *E21B 43/32* (2013.01); *E21B 43/14* (2013.01); *F24J 3/085* (2013.01); *E21B 34/08* (2013.01); *Y02E 10/14* (2013.01); *E21B 43/24* (2013.01)
USPC ........... 166/250.15; 166/272.6; 166/320; 166/302; 166/272.3

(58) Field of Classification Search
CPC ...... E21B 34/24; E21B 43/24; E21B 24/2401
USPC ............. 166/57, 272.3, 302, 303, 272.6, 320, 166/250.15
See application file for complete search history.

(56) References Cited

U.S. PATENT DOCUMENTS

| 2,942,668 | A | 6/1960 | Maly et al. |
| 3,651,655 | A | 3/1972 | Dyre |
| 4,054,176 | A | 10/1977 | Van Huisen |
| 4,109,725 | A | 8/1978 | Williamson et al. |

(Continued)

FOREIGN PATENT DOCUMENTS

| GB | 2252797 A | 8/1992 |
| WO | 2008091345 A1 | 7/2008 |

OTHER PUBLICATIONS

Office Action issued Nov. 9, 2012 for U.S. Appl. No. 12/967,119, 33 pages.

(Continued)

*Primary Examiner* — Kenneth L Thompson
*Assistant Examiner* — Michael Wills, III
(74) *Attorney, Agent, or Firm* — Smith IP Services, P.C.

(57) ABSTRACT

A method of geothermal energy production can include injecting water into a formation, and then automatically decreasing resistance to flow through at least one valve in response to the water changing phase in the formation. A geothermal well system can include a tubular string disposed in a production wellbore, the tubular string including at least one valve, water which flows from an injection wellbore into a formation surrounding the wellbore, and then flows from the formation into the production wellbore as steam, and resistance to flow through the valve decreasing automatically in response to presence of the steam in the production wellbore. Another method of geothermal energy production can include injecting water into a formation from an injection wellbore, the water changing phase in the formation, and then automatically decreasing resistance to fluid flow through at least one valve in response to presence of steam in a production wellbore.

19 Claims, 16 Drawing Sheets

(56) References Cited

U.S. PATENT DOCUMENTS

| | | | |
|---|---|---|---|
| 4,201,060 | A | 5/1980 | Outmans |
| 4,357,802 | A | 11/1982 | Wahl et al. |
| 4,393,928 | A | 7/1983 | Warnock, Sr. |
| 4,664,196 | A | 5/1987 | Manke |
| 4,768,591 | A | 9/1988 | Long et al. |
| 5,167,688 | A | 12/1992 | Cavazos |
| 5,209,303 | A | 5/1993 | Barrington |
| 5,984,014 | A | 11/1999 | Poullard et al. |
| 6,257,334 | B1 | 7/2001 | Cyr et al. |
| 6,490,916 | B1 | 12/2002 | Goodwin et al. |
| 7,032,675 | B2 | 4/2006 | Steele et al. |
| 7,147,057 | B2 | 12/2006 | Steele et al. |
| 7,290,606 | B2 | 11/2007 | Coronado et al. |
| 7,429,030 | B2 | 9/2008 | Dwivedi |
| 7,866,400 | B2 | 1/2011 | Steele et al. |
| 7,918,275 | B2 | 4/2011 | Clem |
| 8,096,362 | B2 | 1/2012 | Steele et al. |
| 2004/0256114 | A1 | 12/2004 | Coronado |
| 2005/0072578 | A1 | 4/2005 | Steele et al. |
| 2006/0027377 | A1 | 2/2006 | Schoonderbeek et al. |
| 2007/0000663 | A1 | 1/2007 | Kelley |
| 2007/0284118 | A1 | 12/2007 | Benton |
| 2008/0035350 | A1 | 2/2008 | Henriksen et al. |
| 2008/0149323 | A1 | 6/2008 | O'Malley et al. |
| 2009/0078427 | A1 | 3/2009 | Patel |
| 2009/0133869 | A1 | 5/2009 | Clem |
| 2009/0139728 | A1* | 6/2009 | Schrader et al. ............... 166/373 |
| 2009/0218089 | A1 | 9/2009 | Steele et al. |
| 2009/0250224 | A1 | 10/2009 | Wright et al. |
| 2012/0145398 | A1 | 6/2012 | Schultz et al. |
| 2012/0145399 | A1 | 6/2012 | Schultz et al. |
| 2012/0145404 | A1 | 6/2012 | Schultz et al. |

OTHER PUBLICATIONS

Office Action issued Nov. 9, 2012 for U.S. Appl. No. 12/967,133, 30 pages.
Office Action issued Feb. 1, 2012 for U.S. Appl. No. 12/967,123, 16 pages.
Office Action issued May 20, 2010, for U.S. Appl. No. 12/960,631, 12 pages.
Office Action issued Jun. 29, 2012 for U.S. Appl. No. 12/967,123, 10 pages.
Syed et al.; "A Simple Approach to Evaluate the Changes in Injectivity in Injection Wells to Improve Performance at Tangri Water Flood", ATC 2003 Conference & Oil Show, Oct. 2003, 15 pages.
Schlumberger; "WellWatcher Permanent Downhole Reservoir and Production Monitoring", article 08-CO-302, dated 2008, 2 pages.
International Search Report with Written Opinion issued Jul. 25, 2012 for PCT Patent Application No. PCT/US11/063734, 9 pages.
International Search Report with Written Opinion issued Jul. 25, 2012 for PCT Patent Application No. PCT/US11/063739, 9 pages.
International Search Report with Written Opinion issued Jul. 25, 2012 for PCT Application No. PCT/US11/063743, 9 pages.
International Search Report with Written Opinion issued Aug. 7, 2012 for PCT Application No. PCT/US11/063743, 11 pages.
International Search Report and Written Opinion issued Apr. 10, 2009, for International Patent Application No. PCT/US09/34176, 7 pages.
International Preliminary Report on Patentability issued Sep. 10, 2010, for International Patent Application No. PCT/US09134176, 6 pages.
Office Action issued May 20, 2010, for U.S. Appl. No. 12/039,206, 16 pages.
Office Action issued Dec. 5, 2012 for U.S. Appl. No. 12/967,123, 23 pages.
Office Action issued Apr. 24, 2013 for U.S. Appl. No. 12/967,133, 25 pages.
Office Action issued Mar. 13, 2013 for U.S. Appl. No. 12/967,123, 12 pages.
Office Action issued Dec. 19, 2013 for U.S. Appl. No. 13/971,746, 19 pages.

* cited by examiner

GEOTHERMAL ENERGY PRODUCTION

BACKGROUND

This disclosure relates generally to equipment utilized and operations performed in conjunction with a subterranean well and, in an example described below, more particularly provides systems, apparatus and methods for geothermal energy production.

It would be beneficial to be able to exclude or restrict liquid water from being produced into a wellbore in a geothermal energy production well. Attempts have been made to accomplish this in the past, but such attempts have not been entirely satisfactory. Therefore, it will be appreciated that improvements are needed in the art.

SUMMARY

In the disclosure below, methods and well systems are provided which bring improvements to the art of geothermal energy production. One example is described below in which a valve is used to prevent, or at least restrict, production of liquid water into a production wellbore.

In one aspect, this disclosure provides to the art a method of geothermal energy production. The method can include injecting water into a subterranean formation, and then automatically decreasing resistance to flow through at least one valve in response to the water changing phase in the formation.

In another aspect, this disclosure provides a geothermal well system which can include a tubular string disposed in a production wellbore, with the tubular string including at least one valve. Water flows from an injection wellbore into a formation surrounding the wellbore, and then flows from the formation into the production wellbore as steam. Restriction to flow through the valve automatically decreases in response to presence of the steam in the production wellbore.

In yet another aspect, a method of geothermal energy production described below can include: injecting water into a subterranean formation from an injection wellbore; the water changing phase in the formation; and then automatically decreasing resistance to flow through at least one valve in response to presence of steam in a production wellbore.

These and other features, advantages and benefits will become apparent to one of ordinary skill in the art upon careful consideration of the detailed description of representative examples below and the accompanying drawings, in which similar elements are indicated in the various figures using the same reference numbers.

DETAILED DESCRIPTION

Schematically illustrated in FIGS. 1A-D are examples of various situations in which a particular type of fluid (liquid and/or gas) can be excluded or produced from a subterranean formation 10 using methods and apparatus which can embody principles of this disclosure. However, it should be understood that the apparatus described below can be used in other methods, and the methods can be practiced using other apparatus, in keeping with the scope of this disclosure.

Figure 1A:
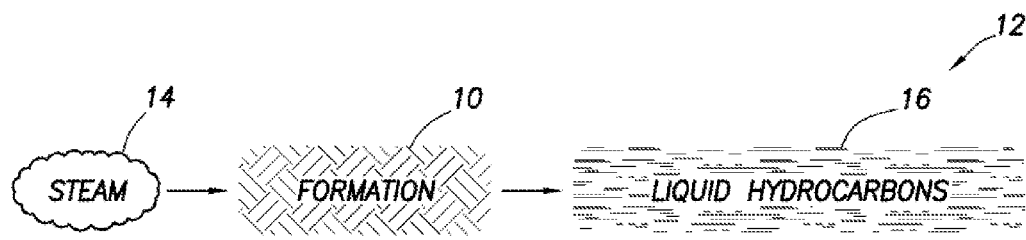
FIGS. 1A-D are schematic illustrations of methods which can embody principles of the present disclosure.

In FIG. 1A, a method 12 is representatively illustrated, in which steam 14 (a gas) is injected into the formation 10. The steam 14 heats hydrocarbons 16 (in solid or semi-solid form) in the formation 10, thereby liquefying the hydrocarbons, so that they can be produced.

One conventional method of performing the method 12 of FIG. 1A is to inject the steam 14 from a wellbore into the formation 10, wait for the steam to condense in the formation (thereby transferring a significant proportion of the steam's heat to the hydrocarbons), and then flowing the condensed steam (liquid water) back into the wellbore with the heated hydrocarbons. This is known as the "huff and puff" or "cyclic steam stimulation" method.

Unfortunately, the period of time needed for the steam 14 to condense in the formation 10 must be estimated, and is dependent on many factors, and so inefficiencies are introduced into the method. If production begins too soon, then some of the steam 14 can be produced, which wastes energy, can damage the formation 10 and production equipment, etc. If production is delayed beyond the time needed for the steam 14 to condense, then time is wasted, less hydrocarbons 16 are produced, etc.

Conventional huff and puff or cyclic steam stimulation methods utilize a vertical wellbore for both injection and production. However, it would be preferable to use one or more horizontal wellbores for more exposure to the formation 10, and to reduce environmental impact at the surface. Unfortunately, it is difficult with conventional techniques to achieve even steam distribution along a horizontal wellbore during the injection stage, and then to achieve even production along the wellbore during the production stage.

Other conventional methods which use injection of steam 14 to mobilize hydrocarbons 16 in a formation 10 include steam assisted gravity drainage (SAGD) and steam flooding. In the SAGD method, vertically spaced apart and generally horizontal wellbores are drilled, and steam 14 is injected into the formation 10 from the upper wellbore while hydrocarbons 16 are produced from the lower wellbore. In steam flooding, various combinations of wellbores may be used, but one common method is to inject the steam 14 into the formation 10 from a vertical wellbore, and produce the hydrocarbons 16 from one or more horizontal wellbores. All of these conventional methods (and others) can benefit from the concepts described below.

In an improved method 12 described below, the liquid hydrocarbons are produced via a valve which closes (or at least increasingly restricts flow) when pressure and temperature approach a water saturation curve, so that steam 14 is not produced through the valve. If the liquid hydrocarbons 16 are to be produced from multiple intervals of the formation 10, the valves can be used to exclude, or increasingly restrict, production from those intervals which would otherwise produce steam 14.

Figure 1B:
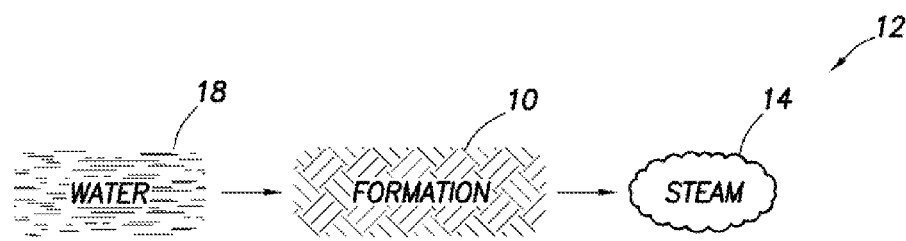

In FIG. 1B, liquid water 18 is injected into the formation 10, the water is heated geothermally in the formation, turning the water to steam 14, and the steam is produced from the formation. The steam 14 may be used for heating buildings, for generating electricity, etc.

Typically, the water 18 is injected into the formation 10 from one wellbore, and the steam 14 is produced from the formation via another one or more other wellbores. However, the same wellbore could be used for injection and production in some circumstances.

Unfortunately, some liquid water 18 can be produced from the formation 10 before it has changed phase to steam 14. This can result in inefficiencies on the production side (e.g., requiring removal of the water from the production wellbore), and is a waste of the effort and energy expended to inject the water which was not turned into steam.

It would be beneficial to be able to prevent production of water 18 in this example, until the water has changed phase to steam 14. In an improved method 12 described below, a valve can be closed when pressure and temperature approach a water saturation curve, so that liquid water 18 is not produced through the valve, or its production is more restricted. If the steam 14 is to be produced from multiple intervals of the formation 10, then multiple valves can be used to prevent production from those respective intervals which would otherwise produce water 18.

Figure 1C:
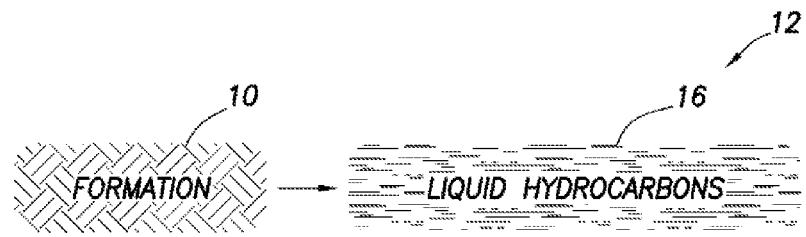

In FIG. 1C, liquid hydrocarbons 16 (e.g., oil) are produced from the formation 10. In this example, it is desired to exclude production of gas from the formation 10, so that only liquid hydrocarbons 16 are produced.

Unfortunately, the production can result in decreased pressure in the formation 10 (at least in the near-wellbore region), leading to hydrocarbon gas coming out of solution in the liquid hydrocarbons 16. The pressure and temperature at which the hydrocarbon gas in the liquid hydrocarbons 16 come out of solution, or a portion of the liquid hydrocarbons begins to boil, is known as the "bubble point" for the liquid hydrocarbons.

As used herein, the term "bubble point" refers to the pressure and temperature at which a first bubble of vapor forms from a mixture of liquid components. The liquid hydrocarbons 16 could be substantially gas condensate, in which case the vapor produced at the bubble point could be the vapor phase of the gas condensate. The liquid hydrocarbons 16 could be a mixture of gas condensate and substantially nonvolatile liquid hydrocarbons, in which case the vapor produced at the bubble point could be the vapor phase of the gas condensate. The liquid hydrocarbons 16 could be a mixture of liquids, with the bubble point being the pressure and temperature at which a first one of the liquids boils.

It would be beneficial to be able to prevent, or at least highly restrict production of hydrocarbon gas from the wellbore in this example. In an improved method 12 described below, this result can be accomplished by closing a valve when pressure and temperature approach a bubble point curve, so that the bubble point is not reached, and only liquid hydrocarbons 16 are produced through the valve. If the liquid hydrocarbons 16 are to be produced from multiple intervals of the formation 10, then multiple valves can be used to prevent or increasingly restrict production from those respective intervals which would otherwise produce hydrocarbon gas.

Figure 1D:
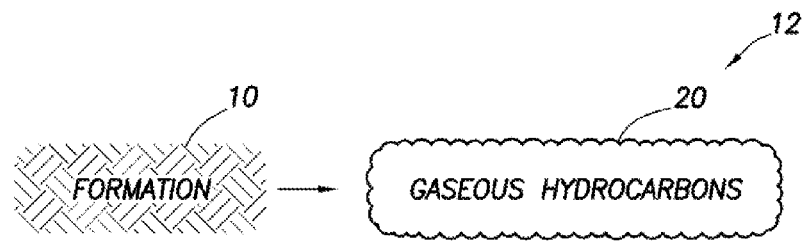

In FIG. 1D, gaseous hydrocarbons 20 are produced from the formation 10. In this example, it is desired to exclude production of liquids from the formation 10, so that only gaseous hydrocarbons 20 are produced.

Unfortunately, the production can result in conditions in the formation 10 (at least in the near-wellbore region), leading to gas condensate forming in the gaseous hydrocarbons 20. The pressures and temperatures at which the gas condensate forms is known as the gas condensate saturation curve for the gaseous hydrocarbons 20.

It would be beneficial to be able to prevent production of gas condensate from the wellbore in this example. In an improved method 12 described below, this result can be accomplished by closing, or increasingly restricting flow through, a valve when pressure and temperature approach the gas condensate saturation curve, so that the gas condensate does not form, and only gaseous hydrocarbons 20 are produced through the valve. If the gaseous hydrocarbons 20 are to be produced from multiple intervals of the formation 10, then multiple valves can be used to prevent or restrict production from those respective intervals which produce gas condensate.

Figure 2A:
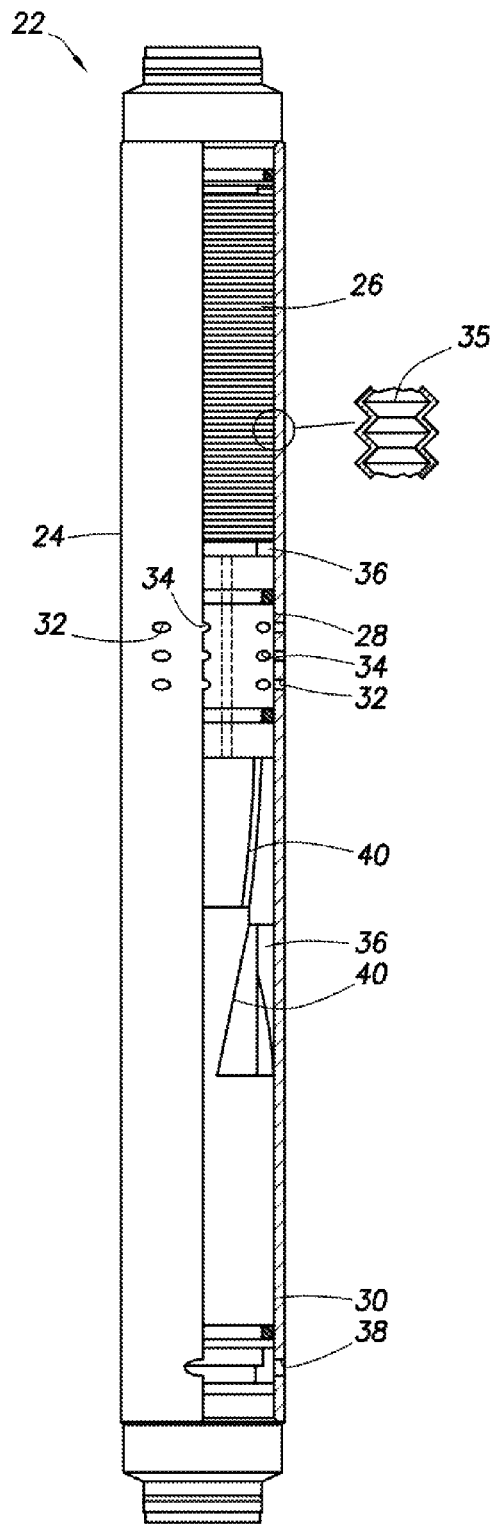
FIGS. 2A & B are schematic quarter-sectional views of a valve which may be used in the methods of FIGS. 1A-D.

Referring additionally now to FIGS. 2A & B, a valve 22 is representatively illustrated in respective closed and open configurations. The valve 22 can be used in the methods described herein, or in any other methods, in keeping with the principles of this disclosure.

The valve 22 includes a generally tubular outer housing assembly 24, a bellows or other expandable chamber 26, a rotatable closure member 28 and a piston 30. The closure member 28 is in the form of a sleeve which rotates relative to openings 32 extending through a sidewall of the housing assembly 24.

In a closed position of the closure member 28 (depicted in FIG. 2A), the openings 32 are not aligned with openings 34 formed through a sidewall of the closure member, and so flow through the openings 32, 34 is prevented (or at least highly restricted). In an open position of the closure member 28 (depicted in FIG. 2B), the openings 32 are aligned with the openings 34, and so flow through the openings is permitted. Another configuration is described below in which, in the closed position, flow outward through the openings 32 is permitted, but flow inward through the openings 32 is prevented.

Figure 2B:
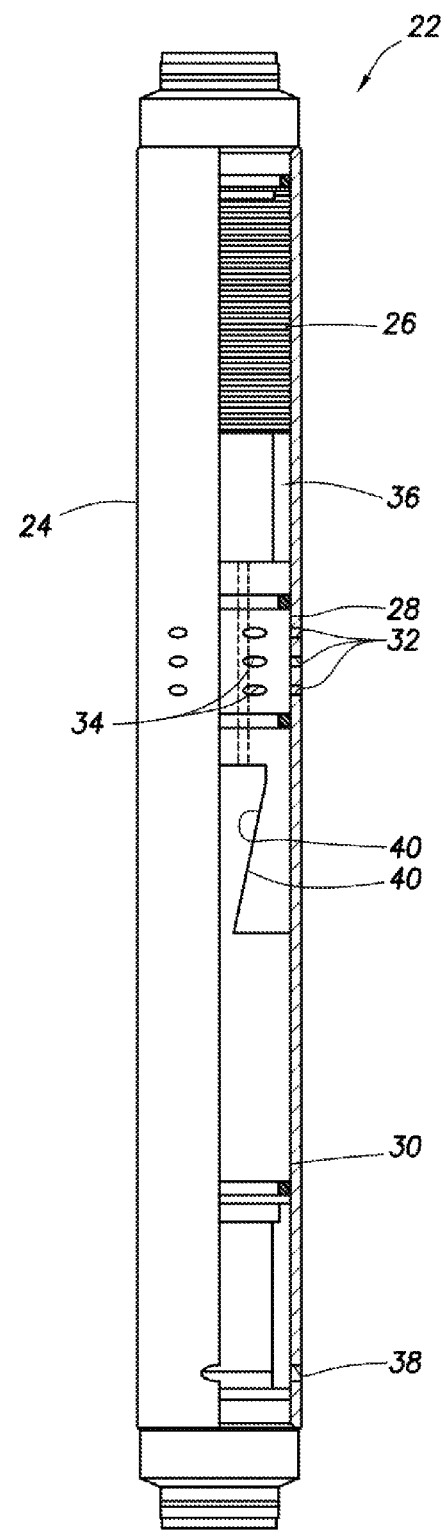

A working fluid is disposed in the chamber 26. The working fluid is selected so that it changes phase and, therefore, experiences a substantial change in volume, along a desired pressure-temperature curve. In FIG. 2A, the working fluid has expanded in volume, thereby expanding the chamber 26. In FIG. 2B, the working fluid has a smaller volume and the chamber 26 is retracted.

A hydraulic fluid 36 is disposed in a volume between the chamber 26 and the piston 30. The hydraulic fluid 36 transmits pressure between the chamber 26 and the piston 30, thereby translating changes in volume of the chamber into changes in displacement of the piston 30.

Ports 38 in the housing assembly 24 sidewall admit pressure on an exterior of the valve 22 to be applied to a lower side of the piston 30. The hydraulic fluid 36 transmits this pressure to the chamber 26.

The working fluid in the chamber 26 is at essentially the same temperature as the exterior of the valve 22, and the pressure of the working fluid is the same as that on the exterior of the valve so, when conditions on the exterior of the valve cross the phase change curve for the working fluid, the phase of the working fluid will change accordingly (e.g., from liquid to gas, or from gas to liquid).

Longitudinal displacement of the piston 30 is translated into rotational displacement of the closure member 28 by means of complementarily shaped helically extending profiles 40 formed on (or attached to) the piston and the closure member. Thus, in a lower position of the piston (as depicted in FIG. 2A), the closure member 28 is rotated to its closed position, and in an upper position of the piston (as depicted in FIG. 2B), the closure member is rotated to its open position.

Note that these positions can be readily reversed, simply by changing the placement of the openings 32, 34, changing the placement of the profiles 40, etc. Thus, the valve 22 could be open when the chamber 26 is expanded, and the valve could be closed when the chamber is retracted.

Rotation of the closure member 28 is expected to require far less force to accomplish, for example, as compared to linear displacement of a sleeve with multiple seals thereon sealing against differential pressure. However, other types of closure members and other means of displacing those closure members may be used, in keeping with the scope of this disclosure.

Instead of flow being entirely prevented in the closed position, the flow could be increasingly restricted. For example, orifices could be provided in the housing assembly 24, so that they align with the openings 34 when the closure member 28 is in its "closed" position.

Preferably, the working fluid comprises an azeotrope. A broad selection of azeotropes is available that have liquid-gas phase behavior to cover a wide range of conditions that may otherwise not be accessible with single-component liquids.

An azeotrope, or constant-boiling mixture, has the same composition in both the liquid and vapor phases. This means that the entire liquid volume can be vaporized with no temperature or pressure change from the start of boiling to complete vaporization. Mixtures in equilibrium with their vapor that are not azeotropes generally require an increase in temperature or decrease in pressure to accomplish complete vaporization. Azeotropes may be formed from miscible or immiscible liquids.

The boiling point of an azeotrope can be either a minimum or maximum boiling point on the boiling-point-composition diagram, although minimum boiling point azeotropes are much more common. Either type may be suitable for use as the working fluid.

Both binary and ternary azeotropes are known. Ternary azeotropes are generally of the minimum-boiling type. Compositions and boiling points at atmospheric pressure of a few selected binary azeotropes are listed in Table 1 below.

TABLE 1

Composition and properties of selected binary azeotropes.

| Compounds | Components BP, ° C. | Azeotrope BP, ° C. | Azeotrope Composition, % |
|---|---|---|---|
| Nonane | 150.8 | 95.0 | 60.2 |
| Water | 100.0 | | 39.8 |
| 1-Butanol | 117.7 | 93.0 | 55.5 |
| Water | 100.0 | | 44.5 |
| Formic acid | 100.7 | 107.1 | 77.5 |
| Water | 100.0 | | 22.5 |
| Heptane | 98.4 | 79.2 | 87.1 |
| Water | 100.0 | | 12.9 |
| Isopropyl alcohol | 82.3 | 80.4 | 87.8 |
| Water | 100.0 | | 12.2 |
| m-Xylene | 139.1 | 94.5 | 60.0 |
| Water | 100.0 | | 40.0 |
| Cyclohexane | 81.4 | 68.6 | 67.0 |
| Isopropanol | 82.3 | | 33.0 |

The above table is derived from the Handbook of Chemistry and Physics, 56th ed.; R. C. Weast, Ed.; CRC Press: Cleveland; pp. D1-D36.

The composition of an azeotrope is pressure-dependent. As the pressure is increased, the azeotrope composition shifts to an increasing fraction of the component with the higher latent heat of vaporization. The composition of the working fluid should match the composition of the azeotrope at the expected conditions for optimum performance. Some azeotropes do not persist to high pressures. Any prospective azeotrope composition should be tested under the expected conditions to ensure the desired phase behavior is achieved.

Figure 3A:
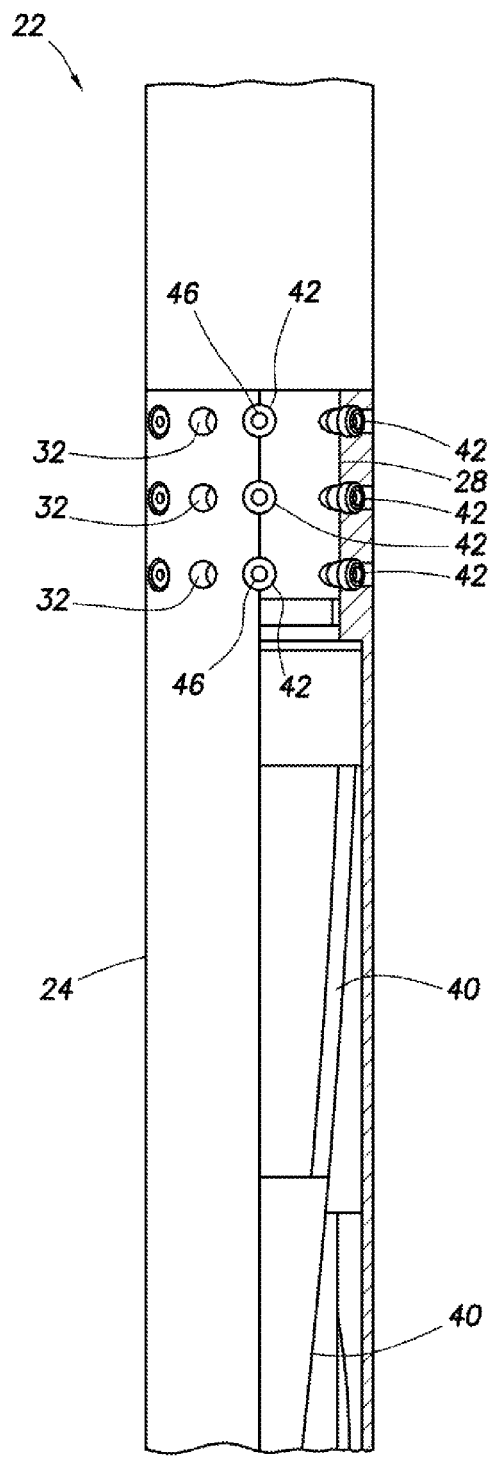
FIGS. 3A & B are enlarged scale schematic partially cross-sectional views of a section of another configuration of the valve.
Figure 3B:
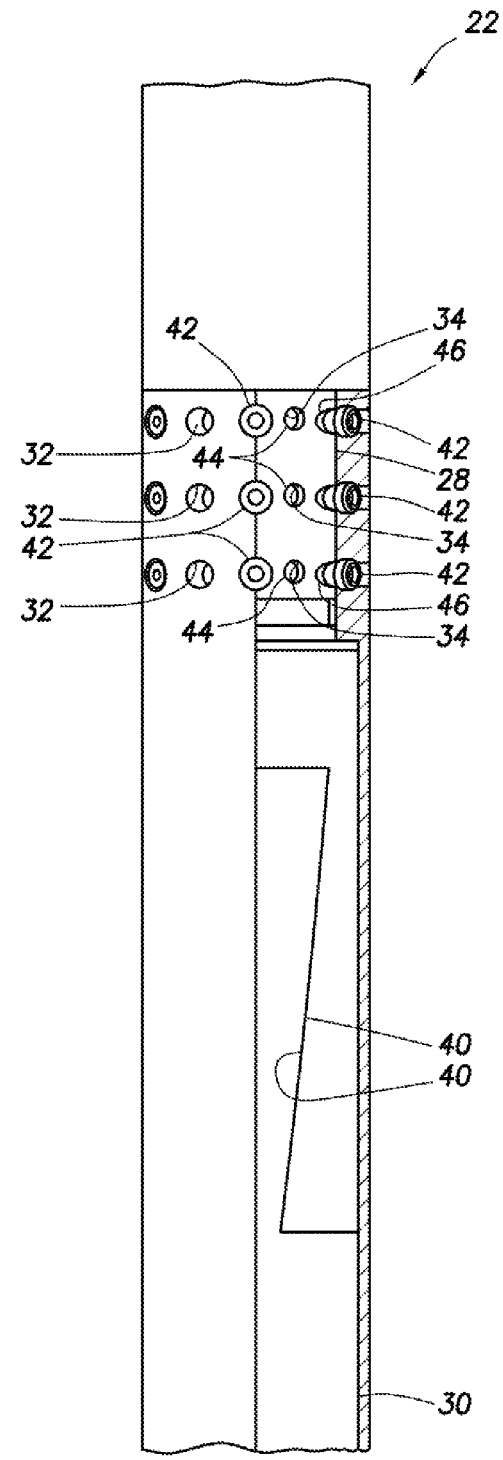

Referring additionally now to FIGS. 3A & B, another configuration of the valve 22 is representatively illustrated. In this configuration, check valves 42 are provided which, in the closed position of the closure member 28 (as depicted in FIG. 3A), permit flow outwardly through the housing assembly 24, but prevent flow inwardly through the housing assembly. In the open position of the closure member 28 (as depicted in FIG. 3B), the openings 32, 34 are aligned with each other, thereby permitting two-way flow through the openings.

Each of the openings 34 has a seat 44 formed thereon for a respective one of the check valves 42. A plug 46 (depicted as a ball in FIGS. 3A & B) of each check valve 42 can sealingly engage the respective seat 44 to prevent inward flow through the openings 34 in the closed position of the closure member 28. When the closure member 28 rotates to the open position, the seats 44 are rotationally displaced relative to the plugs 46.

The piston 30 is downwardly displaced in the closed position of the closure member 28, and is upwardly displaced in the open position of the closure member, as with the configuration of FIGS. 2A & B. However, these positions could be reversed, if desired, as described above.

Figure 4A:
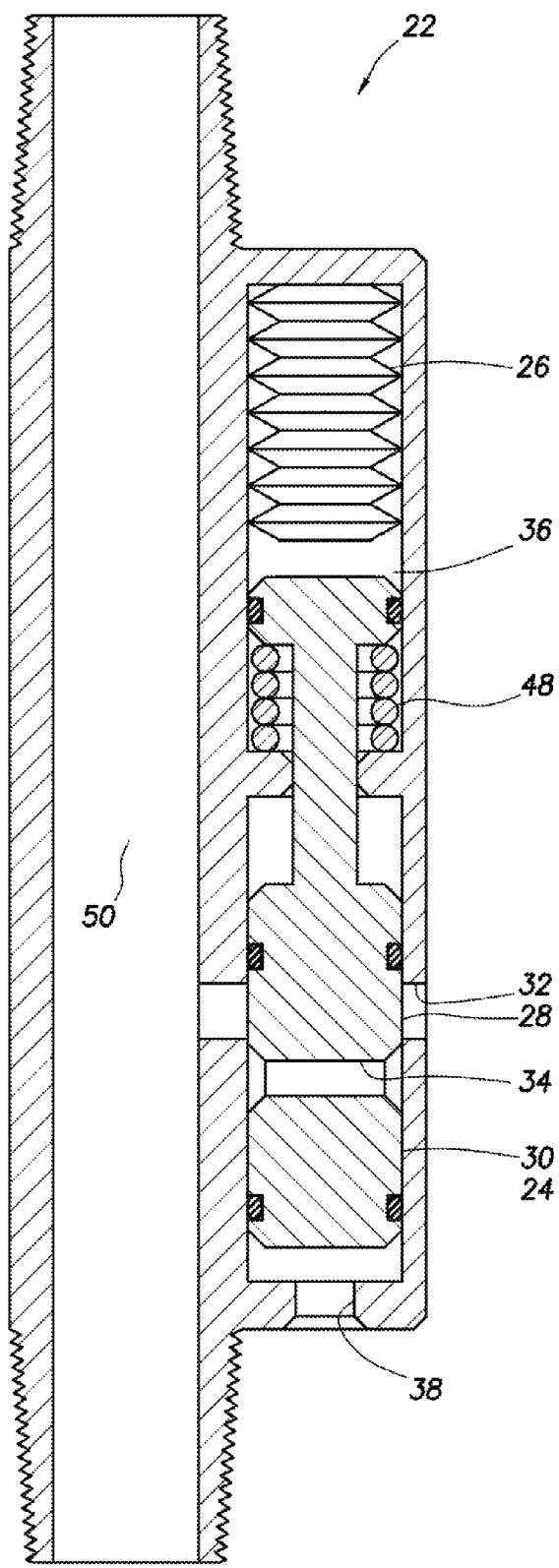
FIGS. 4A & B are schematic cross-sectional views of yet another configuration of the valve.

Referring additionally now to FIGS. 4A & B, another configuration of the valve 22 is representatively illustrated. The valve 22 of FIGS. 4A & B functions in a manner similar to that of the FIGS. 2A & B configuration, in that the valve closes when the chamber 26 expands, and the valve opens when the chamber retracts. However, in the FIGS. 4A & B configuration, the closure member 28 and the piston 30 are integrally formed, and there is no rotational displacement of the closure member. In addition, a biasing device 48 biases the closure member 28 toward its open position.

Figure 4B:
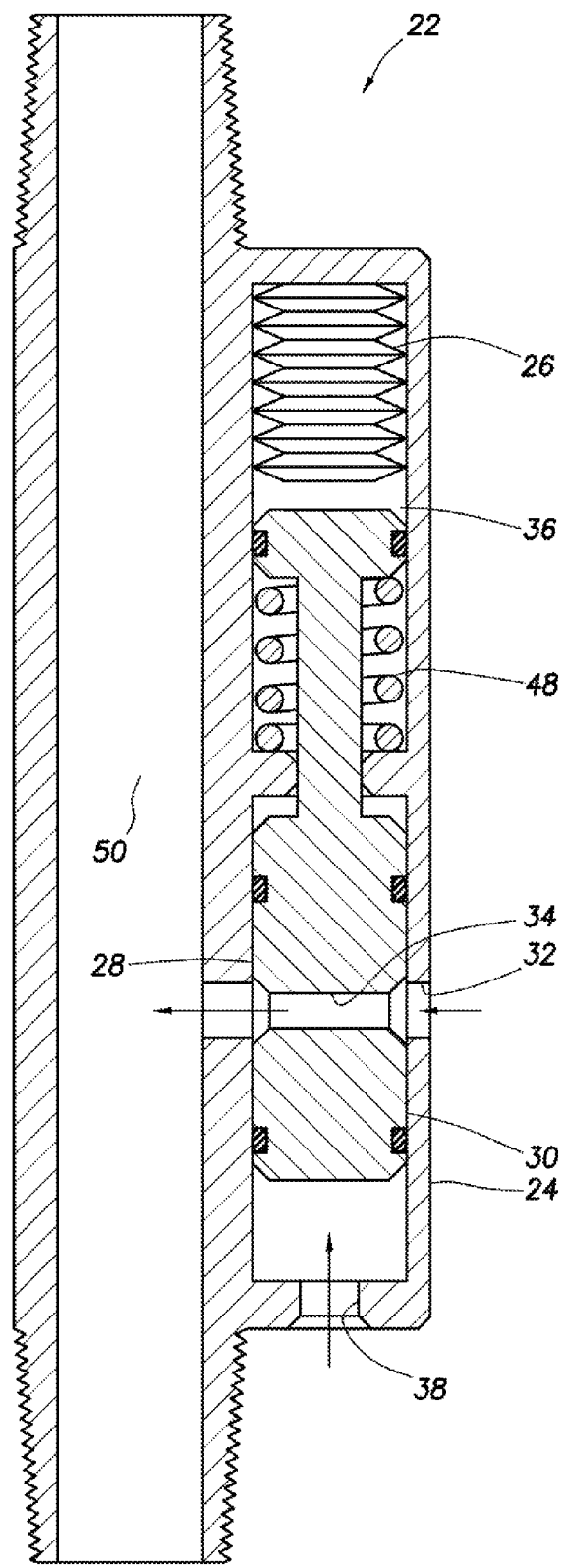

In FIG. 4A, the chamber 26 is expanded (due to the working fluid therein being in its vapor phase), and the closure member 28 and piston 30 are displaced downward to their closed position, preventing (or at least highly restricting) flow through the openings 32, 34. In FIG. 4B, the chamber 26 is retracted (due to the working fluid therein being in its liquid phase), and the closure member 28 and piston 30 are displaced upward to their open position, permitting flow through the openings 32, 34 into an inner flow passage 50 extending longitudinally through the valve 22. When the valve 22 is interconnected in a tubular string, the flow passage 50 preferably extends longitudinally through the tubular string, as well.

Figure 5:
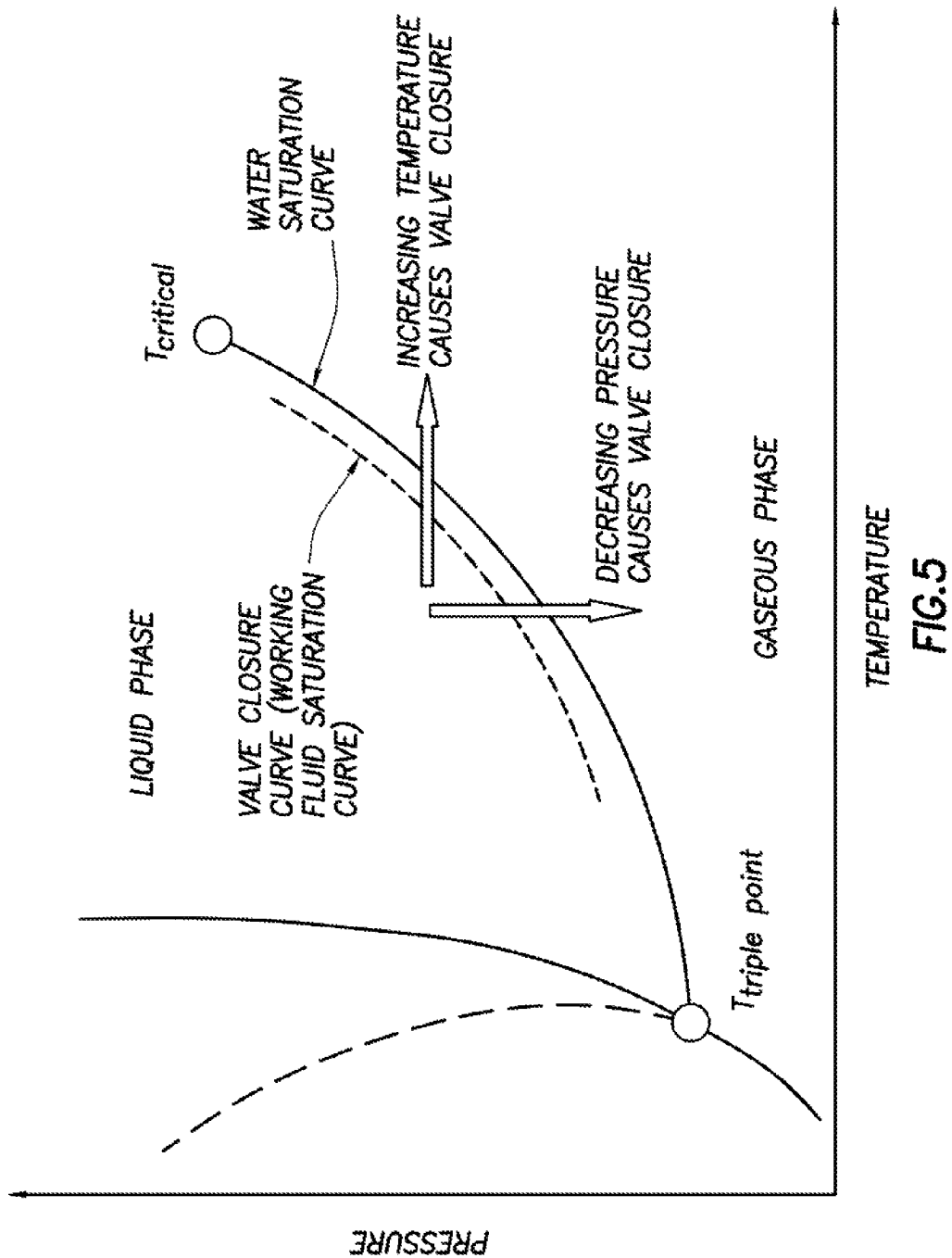
FIG. 5 is a phase diagram showing a selected relationship between a working fluid saturation curve and a water saturation curve.

FIG. 5 shows how the valve 22 can be used in the method 12 of FIG. 1A to exclude or reduce production of steam 14. The valve 22 is positioned in a production wellbore, interconnected in a production tubular string. The valve 22, thus, prevents steam 14 from flowing into the production tubular string.

The valve 22 can be configured to restrict, but not entirely prevent flow by providing a flow restriction (such as, an orifice, etc.) which aligns with the opening 34 when the closure member 28 is in its "closed" position.

The working fluid is selected so that its saturation curve is offset somewhat on a liquid phase side from a water saturation curve, as depicted in FIG. 5. The working fluid is in liquid phase, the chamber 26 is retracted, and the valve 22 is open, as long as the pressure for a given temperature is greater than that of the working fluid saturation curve, and as long as the temperature for a given pressure is less than that of the working fluid saturation curve.

However, as the pressure and/or temperature change, so that they approach the water saturation curve and cross the working fluid saturation curve, the working fluid changes to vapor phase. The increased volume of the working fluid causes the chamber 26 to expand, thereby closing the valve 22. Preferably, the valve 22 closes prior to the pressure and temperature crossing the water saturation curve, so that little or no steam 14 is produced through the valve.

Figure 6A:
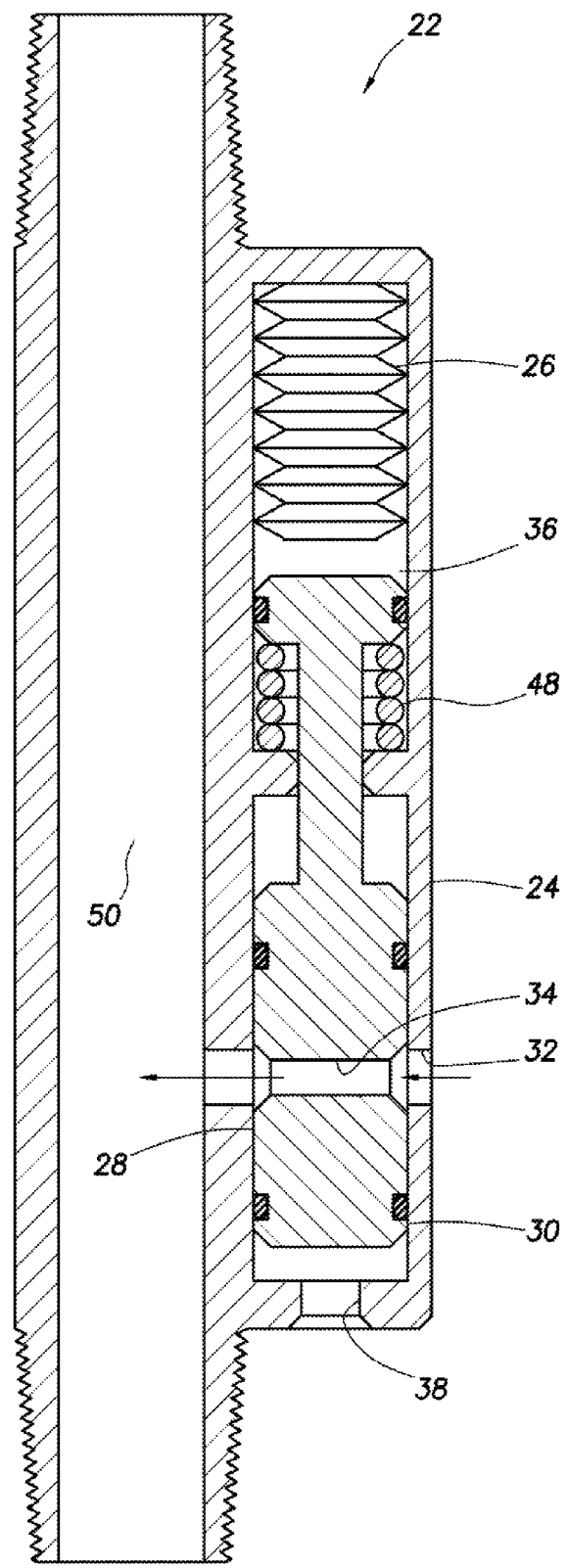
FIGS. 6A & B are schematic cross-sectional views of another configuration of the valve.
Figure 6B:
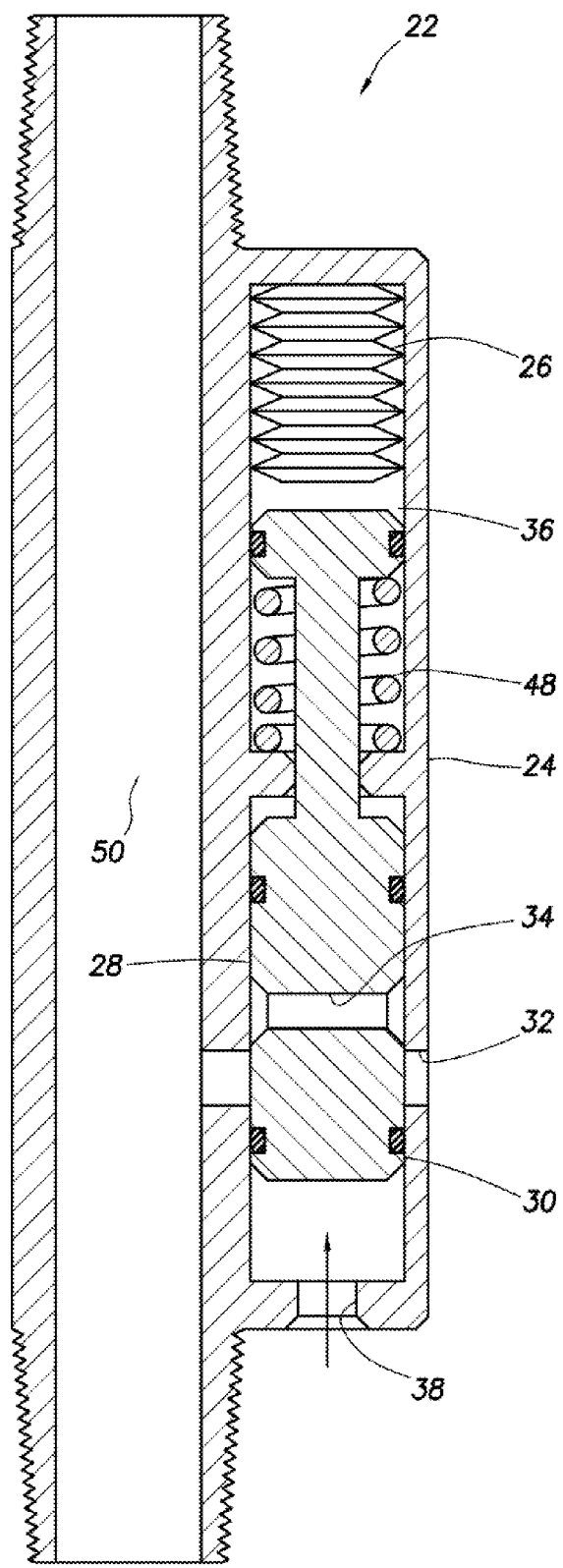

Referring additionally now to FIGS. 6A & B, another configuration of the valve 22 is representatively illustrated. In this configuration, the valve 22 is open when the chamber 26 is expanded (as depicted in FIG. 6A), and the valve is closed when the chamber is retracted (as depicted in FIG. 6B). This difference is achieved merely by changing the placement of the openings 34 as compared to the configuration of FIGS. 4A & B, so that, when the closure member 28 and piston 30 are in their lower position the openings 32, 34 are aligned, and when the closure member and piston are in their upper position the openings are not aligned.

Figure 7:
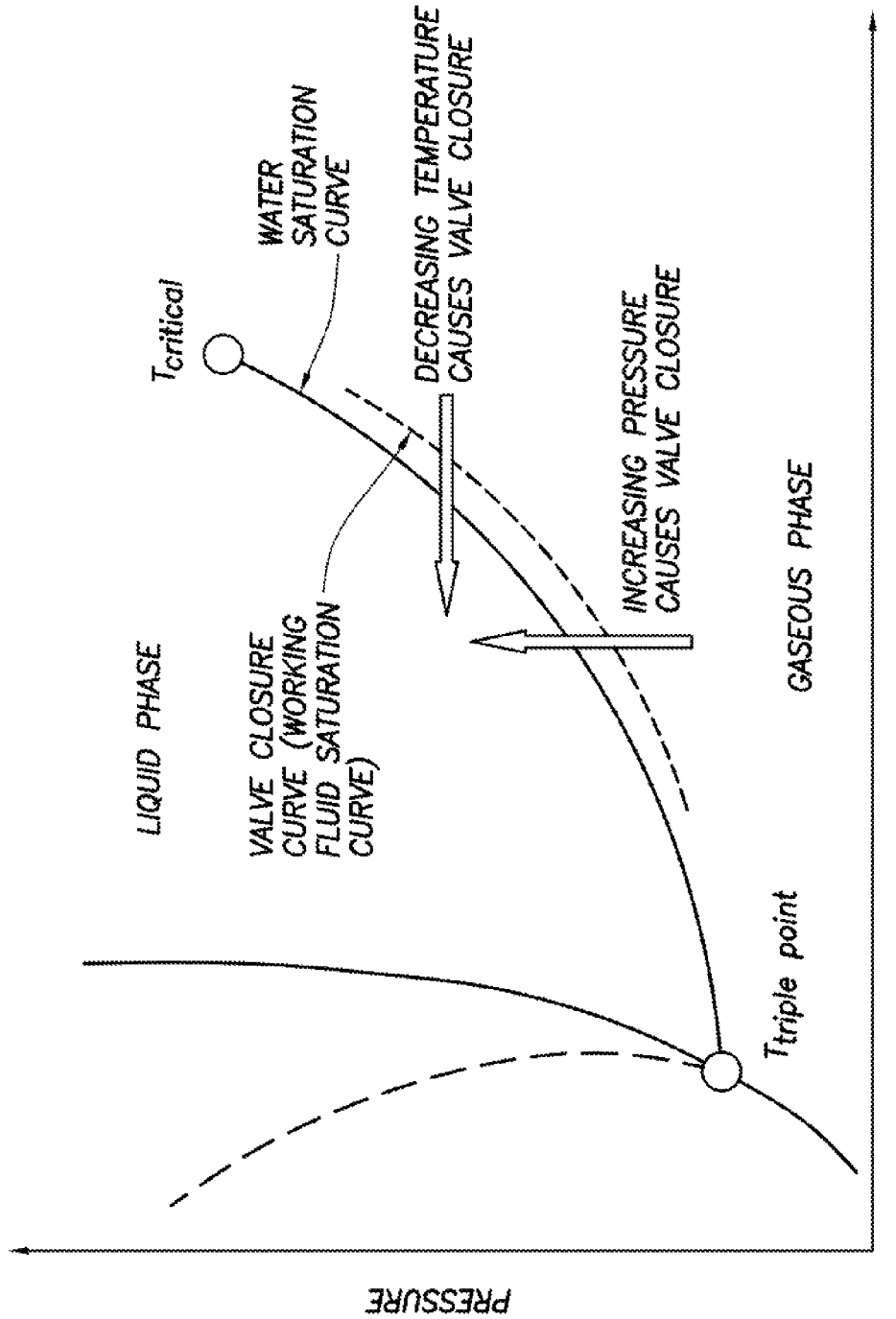
FIG. 7 is a phase diagram showing another selected relationship between a working fluid saturation curve and a water saturation curve.

FIG. 7 shows how the valve 22 configuration of FIGS. 6A & B can be used in the method 12 of FIG. 1B to exclude or reduce production of liquid water 18. The valve 22 is positioned in a production wellbore, interconnected in a production tubular string. The valve 22, thus, prevents water 18 from flowing into the production tubular string.

The working fluid is selected so that its saturation curve is offset somewhat on a gaseous phase side from a water saturation curve, as depicted in FIG. 7. The working fluid is in vapor phase, the chamber 26 is expanded, and the valve 22 is open, as long as the pressure for a given temperature is less than that of the working fluid saturation curve, and as long as the temperature for a given pressure is greater than that of the working fluid saturation curve.

However, as the pressure and/or temperature change, so that they approach the water saturation curve and cross the working fluid saturation curve, the working fluid changes to liquid phase. The decreased volume of the working fluid causes the chamber 26 to retract, thereby closing the valve 22. Preferably, the valve 22 closes prior to the pressure and temperature crossing the water saturation curve, so that no water 18 is produced through the valve.

Figure 8:
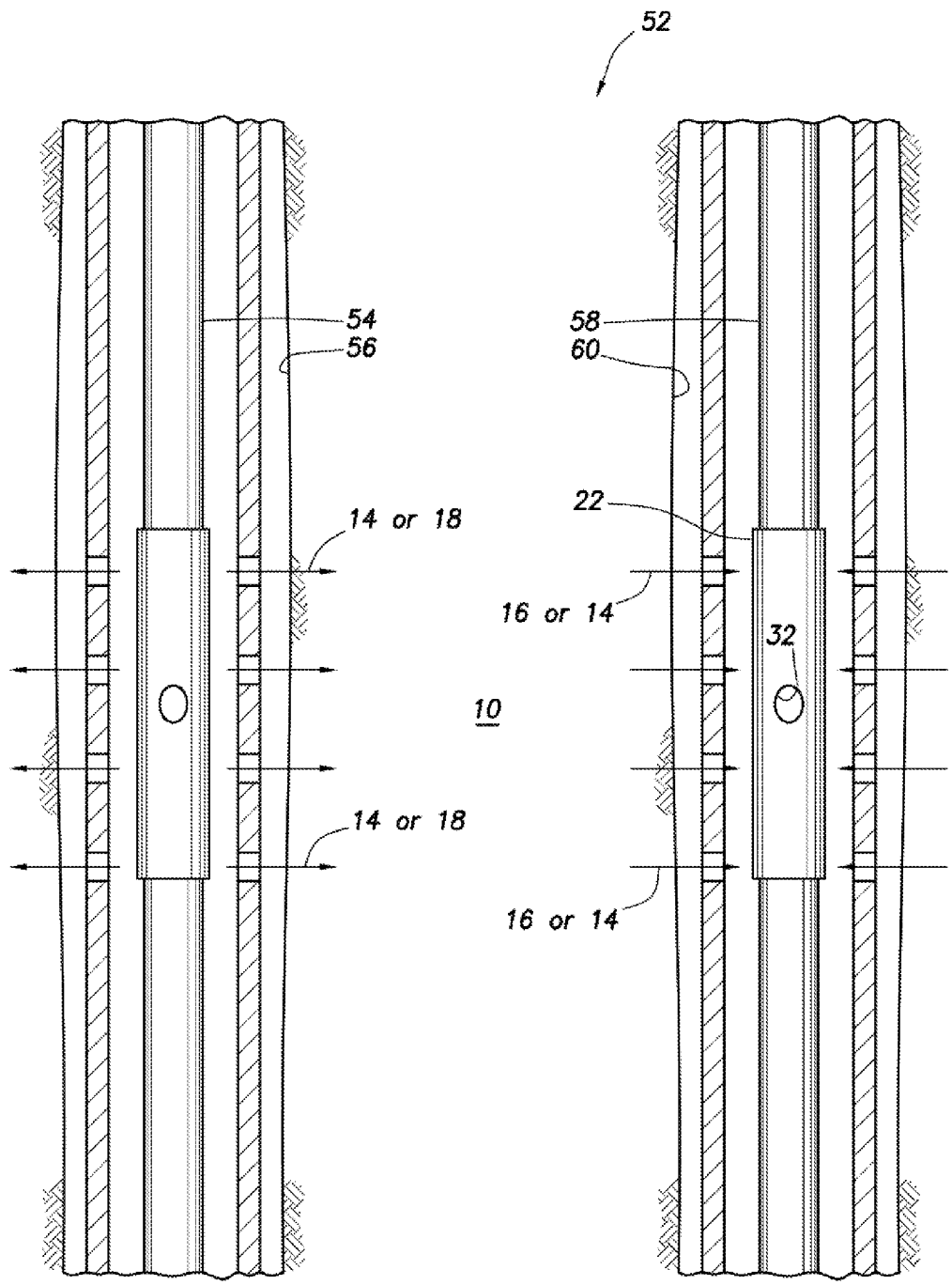
FIG. 8 is a schematic partially cross-sectional view of a well system which can embody principles of this disclosure.

Referring additionally now to FIG. 8, an example of a well system 52 in which the improved methods 12 of FIGS. 1A & B can be performed is representatively illustrated. If the method 12 of FIG. 1A is performed, steam 14 can be injected into the formation 10 from an injection tubular string 54 in an injection wellbore 56, and liquid hydrocarbons 16 can be produced into a production tubular string 58 in a production wellbore 60.

If the wellbores 56, 60 are generally vertical, this example could correspond to a steam flood operation, and if the wellbores are generally horizontal, this example could correspond to a SAGD operation (with the injection wellbore 56 being positioned above the production wellbore 60). In a "huff and puff" or "cyclic steam stimulation" operation, the wellbores 56, 60 can be the same wellbore, the tubular string 54, 58 can be the same tubular string, and the wellbore can be generally vertical, horizontal or inclined.

The valve 22 can be interconnected in the production tubular string 58 and configured to close if pressure and temperature approach the water saturation curve from the liquid phase side. Thus, the working fluid can be chosen as depicted in FIG. 5, and the valve 22 can be configured to close when the chamber 26 expands (i.e., when the working fluid changes to vapor phase), as with the configurations of FIGS. 2A-4B.

If the method 12 of FIG. 1B is performed, liquid water 18 is injected via the injection wellbore 56, the water changes phase in the formation 10, and the resulting steam 14 is produced via the valve 22 in the production wellbore 60. The valve 22 preferably remains open as long as steam 14 is produced, but the valve closes to prevent production of liquid water 18.

In this example, the valve 22 can be interconnected in the production tubular string 58 and configured to close if pressure and temperature approach the water saturation curve from the gaseous phase side. Thus, the working fluid can be chosen as depicted in FIG. 7, and the valve 22 can be configured to close when the chamber 26 retracts (i.e., when the working fluid changes to liquid phase), as with the configurations of FIGS. 6A & B (or the configurations of FIGS. 2A-4B with the openings 32, 34 repositioned as described above).

Figure 9:
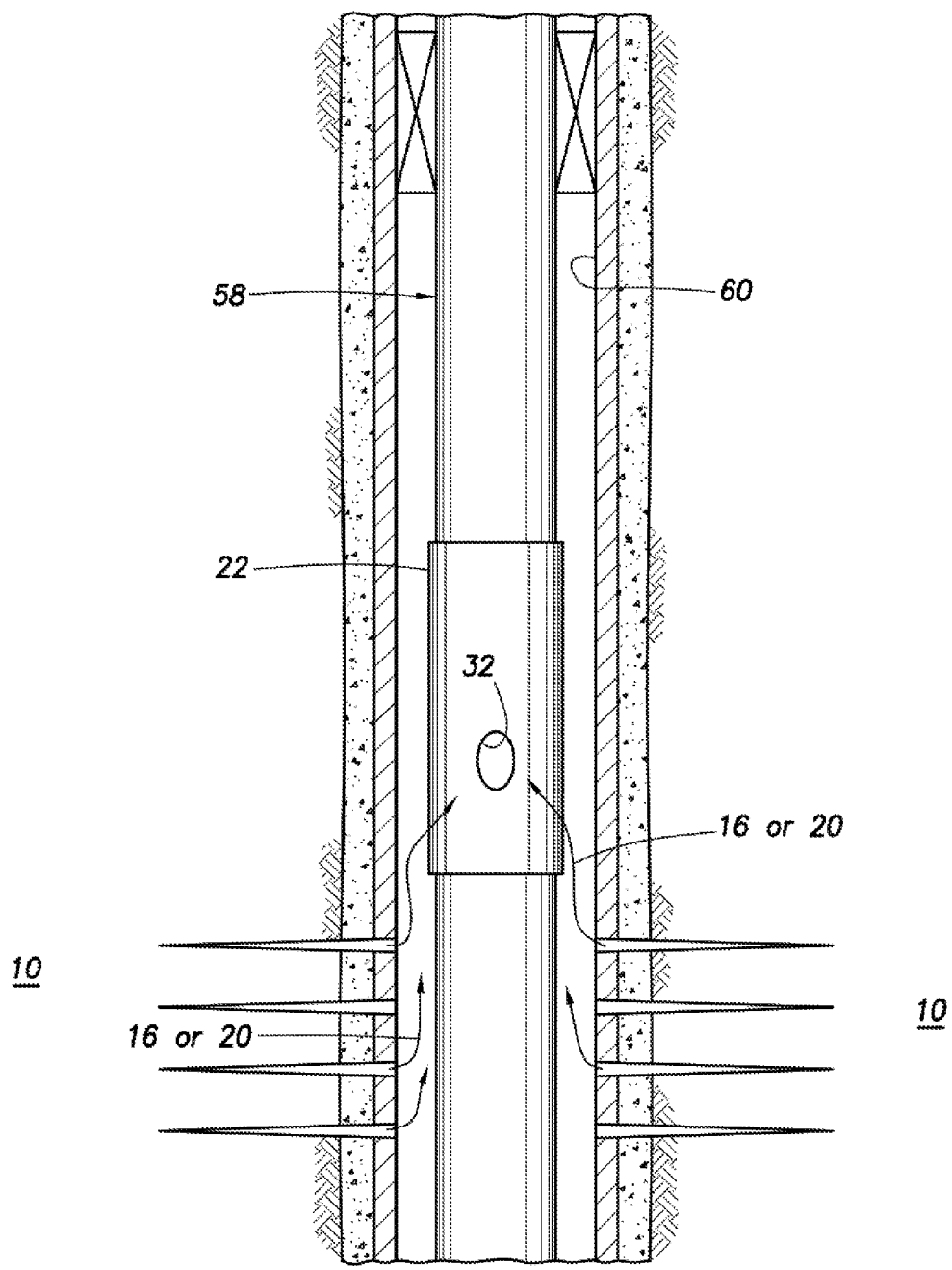
FIG. 9 is a schematic partially cross-sectional view of another well system which can embody principles of this disclosure.

Referring additionally now to FIG. 9, an example of a well system 62 in which the improved methods 12 of FIGS. 1C & D can be performed is representatively illustrated. The valve 22 is interconnected in the production string 58 in the production wellbore 60, but no injection wellbore is depicted in FIG. 9, although an injection wellbore (e.g., for steam flooding, water flooding, etc.) could be provided in other examples.

Figure 10A:
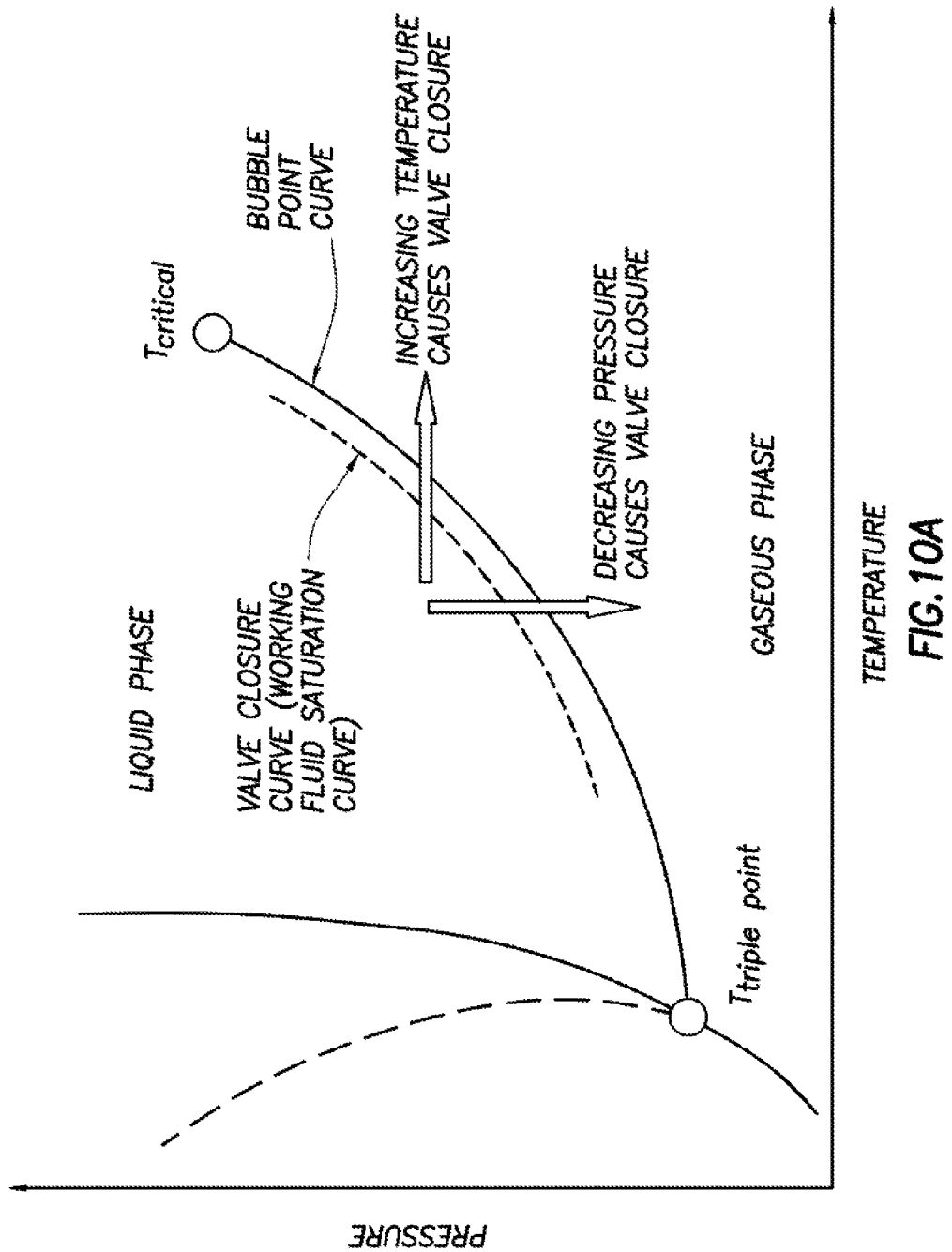
FIGS. 10A & B are phase diagrams showing selected relationships between a working fluid saturation curve and a bubble point curve or a gas condensate saturation curve.

For production of liquid hydrocarbons 16 and exclusion of gas (as in the method 12 of FIG. 1C), the valve 22 could be configured as depicted in any of FIGS. 2A-4B, with the working fluid selected so that it has a saturation curve as representatively illustrated in FIG. 10A. The working fluid saturation curve depicted in FIG. 10A is offset to the liquid phase side from the bubble point curve for the liquid hydrocarbons 16 being produced.

Therefore, the valve 22 will close when the pressure for a given temperature decreases to the working fluid saturation curve and approaches the bubble point curve. The valve 22 will also close when the temperature for a given pressure increases to the working fluid saturation curve and approaches the bubble point curve.

The valve 22 remains open as long as only liquid hydrocarbons 16 are being produced. However, when the pressure and temperature cross the working fluid saturation curve and the working fluid changes to vapor phase, the valve 22 closes.

Figure 10B:
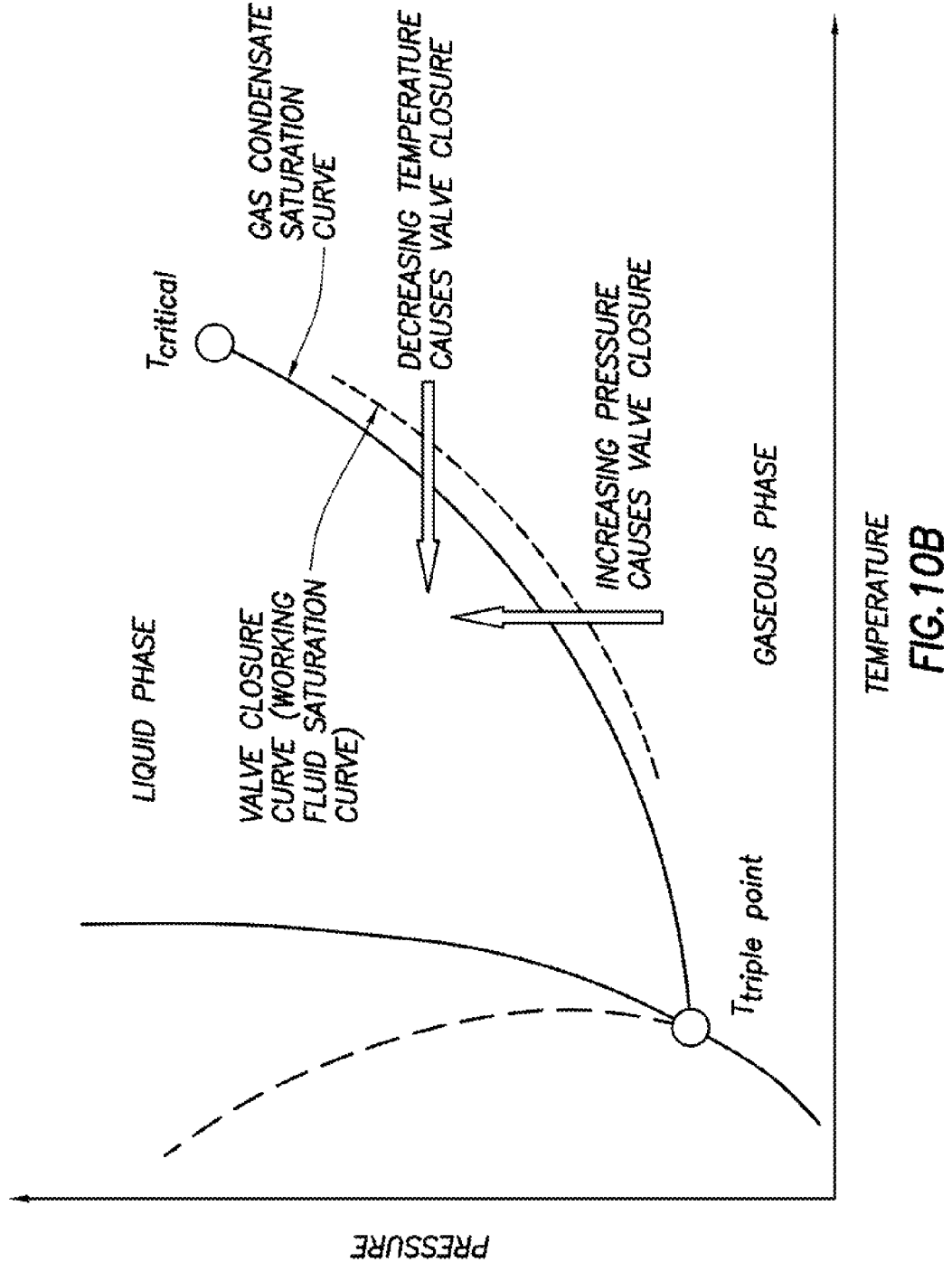

For production of gaseous hydrocarbons 20 and exclusion of gas condensate (as in the method 12 of FIG. 1D), the valve 22 could be configured as depicted in FIGS. 6A & B, or with the repositioned openings 32, 34 as discussed above for the configurations of FIGS. 2A-4B), with the working fluid selected so that it has a saturation curve as representatively illustrated in FIG. 10B. The working fluid saturation curve depicted in FIG. 10B is offset to the gaseous phase side from the gas condensate saturation curve for the gaseous hydrocarbons 20 being produced.

Therefore, the valve 22 will close when the pressure for a given temperature increases to the working fluid saturation curve and approaches the gas condensate saturation curve. The valve 22 will also close when the temperature for a given pressure decreases to the working fluid saturation curve and approaches the gas condensate saturation curve.

The valve 22 remains open as long as only gaseous hydrocarbons 20 are being produced. However, when the pressure and temperature cross the working fluid saturation curve and the working fluid changes to liquid phase, the valve 22 closes.

Figure 11:
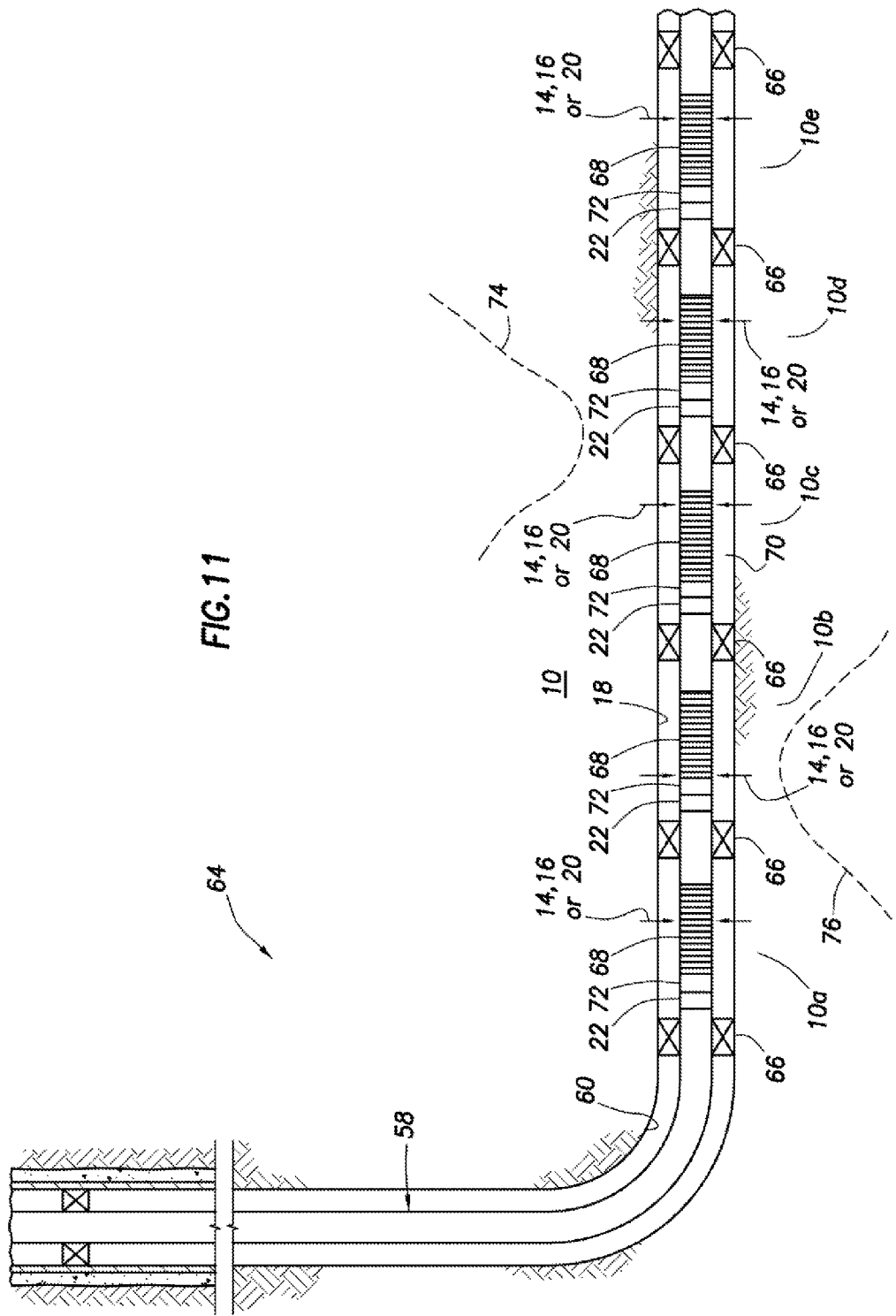
FIG. 11 is a schematic partially cross-sectional view of another well system which can embody principles of this disclosure.

Referring additionally now to FIG. 11, another well system 64 in which the valve 22 may be used for production of steam 14, liquid hydrocarbons 16 or gaseous hydrocarbons 20 is representatively illustrated. The methods of any of FIGS. 1A-D may be performed with well system 64, although the well system may be used with other methods in keeping with the principles of this disclosure.

In the well system 64, multiple valves 22 are interconnected in the production tubular string 58 in a generally horizontal section of the wellbore 60. Also interconnected in the tubular string 58 are annular barriers 66 (such as packers, etc.) and well screens 68.

The annular barriers 66 isolate intervals 10a-e of the formation 10 from each other in an annulus 70 formed radially between the tubular string 58 and the wellbore 60. The valves 22 selectively permit and prevent (or increasingly restrict) flow between the annulus 70 and the flow passage 50 in the tubular string 58. Thus, each valve 22 controls flow between the interior of the tubular string 58 and a respective one of the formation intervals 10a-e.

In the example of FIG. 11, the steam 14, hydrocarbons 16 or gaseous hydrocarbons 20 enter the wellbore 60 and flow through the well screens 68, through flow restrictors 72 (also known to those skilled in the art as inflow control devices), and then through the valves 22 to the interior flow passage 50. Any of the valve 22 configurations of FIGS. 2A-4B and 6A & B may be used with appropriate modification to accept flow from the well screens 68 and/or the flow restrictors 72.

The flow restrictors 72 operate to balance production along the wellbore 60, in order to prevent gas coning 74 and/or water coning 76. Each valve 22 operates to exclude or restrict production of steam 14 (in the case of the method 12 of FIG. 1A being performed), to exclude or restrict production of water 18 (in the case of the method 12 of FIG. 1B being performed), to exclude or restrict production of gas (in the case of the method 12 of FIG. 1C being performed), or to exclude or restrict production of gas condensate (in the case of the method 12 of FIG. 1D being performed), for the respective one of the formation intervals 10a-e.

Steam 14, liquid hydrocarbons 16 or gaseous hydrocarbons 20 can still be produced from some of the formation intervals 10a-e via the respective valves 22, even if one or more of the other valves has closed to exclude or restrict production from its/their respective interval(s). If a valve 22 has closed, it can be opened if conditions (e.g., pressure and temperature) are such that steam 14 (for the FIG. 1A method), water 18 (for the FIG. 1B method), gas (for the FIG. 1C method) or gas condensate (for the FIG. 1D method) will not be unacceptably produced.

Figure 12:
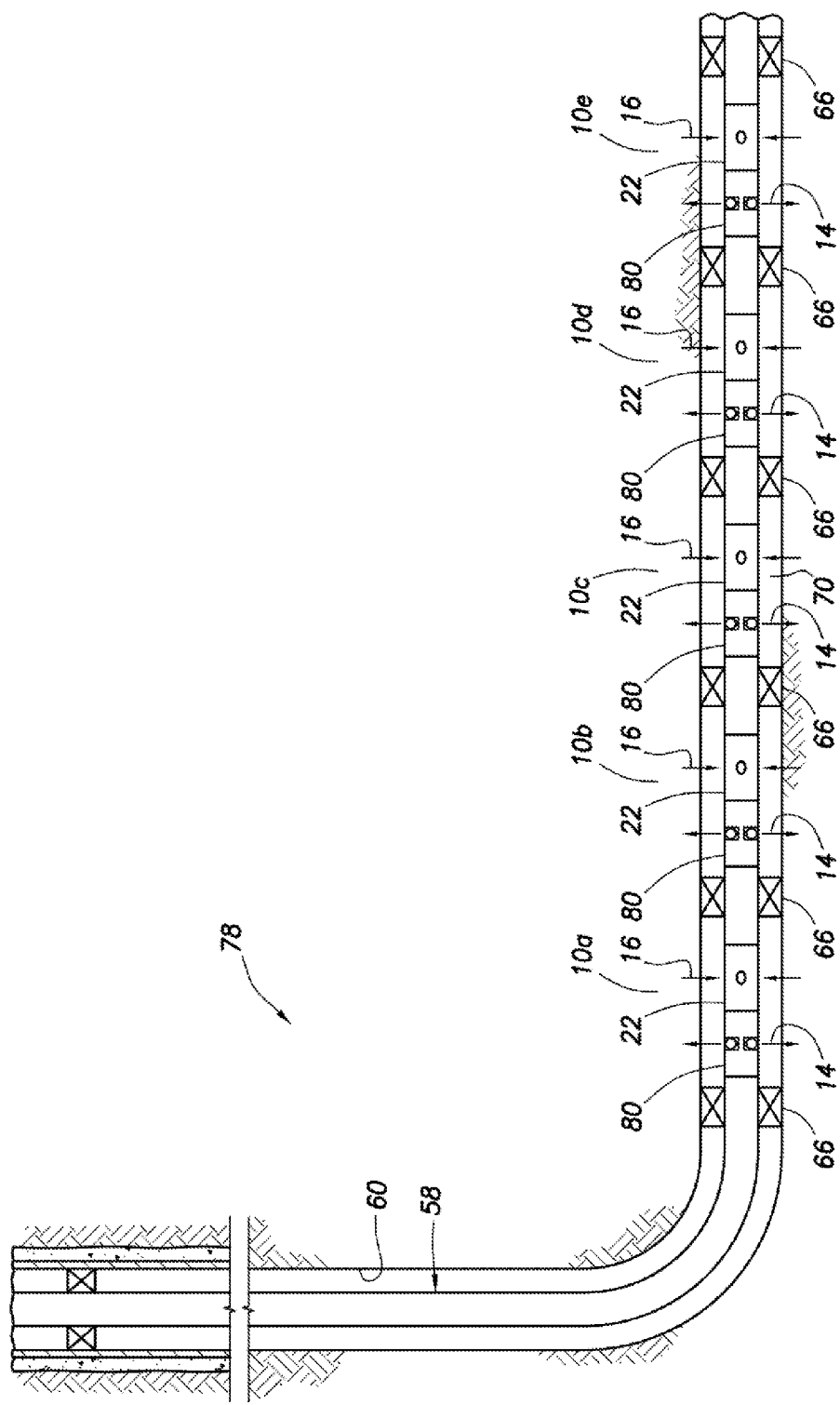
FIG. 12 is a schematic partially cross-sectional view of another well system which can embody principles of this disclosure.

Referring additionally now to FIG. 12, another well system 78 is representatively illustrated. The method 12 of FIG. 1A may be performed with the well system 78, although other methods could be performed in keeping with the principles of this disclosure.

In the method 12, steam 14 is injected into the formation 10, heat from the steam is transferred to hydrocarbons in the formation, and then liquid hydrocarbons 16 are produced from the formation (along with condensed steam). These steps are repeatedly performed.

In the well system 78 as depicted in FIG. 12, multiple valves 22 are used to exclude or restrict production of steam 14 from the respective formation intervals 10a-e. Check valves 80 permit outward flow of the steam 14 from the tubular string 58 to the formation 10 during the steam injection steps, while the valves 22 are closed. The check valves 80 prevent inward flow of fluid into the tubular string 58.

Note that, if the valve configuration of FIGS. 3A & B is used, the separate check valves 80 are not needed, since the check valves 42 provide the function of permitting outward flow, but preventing inward flow, while the valves 22 are closed. Thus, the steam 14 can be injected into the formation 10 via the check valves 42 while the valves 22 are closed.

Although the well screens 68 and flow restrictors 72 are not illustrated in FIG. 12, it should be understood that either or both of them could be used in the well system 78, if desired. For example, well screens 68 could be used to filter the liquid hydrocarbons 16 flowing into the tubular string 58 via the valves 22 during the production stages, and flow restrictors 72 could be used to balance injection and/or production flow between the formation 10 and the tubular string 58 along the wellbore 60. Flow restrictors 72 could, thus, restrict flow through the check valves 80 or 42, and/or to restrict flow through the valves 22.

Figure 13:
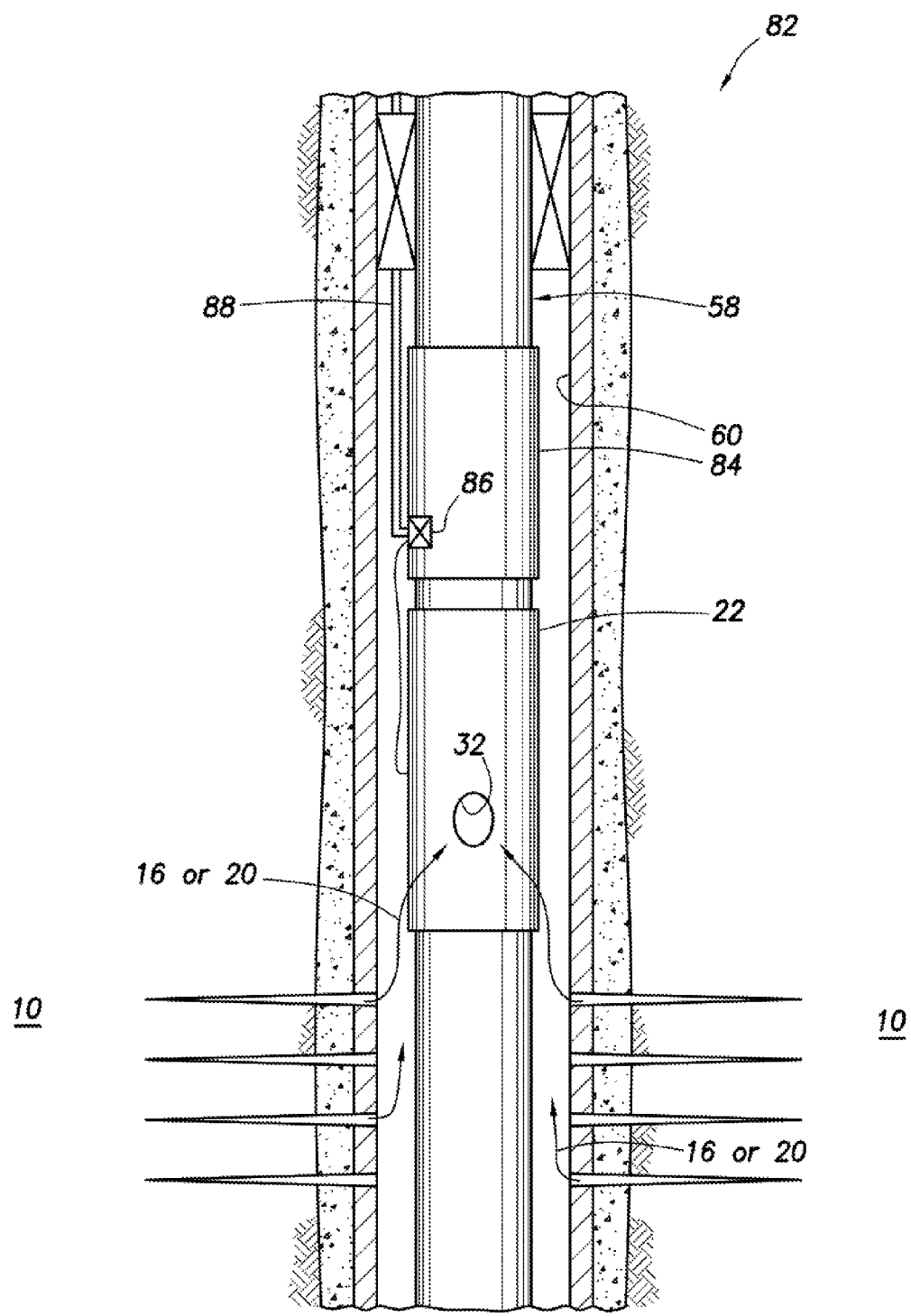
FIG. 13 is a schematic partially cross-sectional view of another well system which can embody principles of this disclosure.

Referring additionally now to FIG. 13, another well system 82 is representatively illustrated. The well system 82 is similar in many respects to the well system of FIG. 9, but differs at least in that the valve 22 is used to trigger operation of another well tool 84.

For example, if the FIG. 1A method 12 is performed, the valve 22 opens when liquid hydrocarbons 16 are produced, but steam 14 is not produced. Opening of the valve 22 can cause a valve 86 of the well tool 84 to open, thereby discharging a relatively low density fluid into the flow passage 50 of the tubular string 58 for artificial lift purposes. The low density fluid could be delivered via a control line 88 extending to the surface, or another remote location.

As another example, if the FIG. 1B method 12 is performed, the valve 22 opens when gaseous hydrocarbons 20 are produced, but gas condensate is not produced. Opening of the valve 22 can cause the valve 86 to open, thereby discharging a treatment substance into the flow passage 50 of the tubular string 58 (e.g., for prevention of precipitate formation, etc.). The treatment substance could be delivered via the control line 88.

The well tool 84 could be used in conjunction with the valve 22 in any of the well systems and methods described above.

It can now be fully appreciated that the above disclosure provides several advancements to the art. The well systems 52, 78 permit efficient geothermal energy production by excluding production of water 18 into the production wellbore 60.

The above disclosure provides to the art a method 12 of geothermal energy production. The method 12 can include injecting water 18 into a subterranean formation 10, and then automatically decreasing resistance to flow through at least one valve 22 in response to the water 18 changing phase in the formation 10.

The step of injecting water 18 can include flowing the water 18 into the formation 10 from an injection wellbore 56 which extends substantially horizontally.

The at least one valve 22 can comprise multiple valves 22, each valve 22 being responsive to the water 18 changing phase in a respective one of multiple intervals 10a-e of the formation 10.

The method 12 can also include selecting a working fluid 35 of the valve 22 such that the valve 22 automatically closes when pressure and temperature in the formation 10 approach water's saturation curve from a gaseous phase side thereof.

The working fluid 35 may comprise an azeotrope.

The step of injecting the water 18 can include flowing the water 18 out of an injection wellbore 56, and automatically decreasing resistance to flow through the valve 22 can include flowing steam 14 into the valve 22 in a production wellbore 60.

Opening the valve 22 may include rotating a closure member 28 of the valve 22.

A geothermal well system 52, 78 described above can include a tubular string 58 disposed in a production wellbore 60, the tubular string 58 including at least one valve 22, water 18 which flows from an injection wellbore 56 into a formation 10 surrounding the injection wellbore 56, and then flows from the formation 10 into the production wellbore 60 as steam 14, with resistance to flow through the valve 22 decreasing automatically in response to presence of the steam 14 in the production wellbore 60.

The valve 22 may comprise a working fluid 35 which expands and thereby increasingly restricts flow through the valve 22 in response to pressure and temperature in the formation 10 which approach the water's saturation curve from a gaseous phase side thereof.

At least one of the injection and production wellbores 56, 60 extends substantially horizontally.

Also described above is a method 12 of geothermal energy production which can include: injecting water 18 into a subterranean formation 10 from an injection wellbore 56; the water 18 changing phase in the formation 10; and then automatically decreasing resistance to flow through at least one valve 22 in response to presence of steam 14 in a production wellbore 60.

It is to be understood that the various examples described above may be utilized in various orientations, such as inclined, inverted, horizontal, vertical, etc., and in various configurations, without departing from the principles of the present disclosure. The embodiments illustrated in the drawings are depicted and described merely as examples of useful applications of the principles of the disclosure, which are not limited to any specific details of these embodiments.

In the above description of the representative examples of the disclosure, directional terms, such as "above," "below," "upper," "lower," etc., are used for convenience in referring to the accompanying drawings.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of geothermal energy production, the method comprising:
   injecting water in liquid form into a subterranean formation; and
   then automatically decreasing resistance to flow through at least one valve in response to the water changing to steam in the formation, wherein the valve selectively permits and prevents flow between the formation and a tubular string disposed in a production wellbore.

2. The method of claim 1, wherein injecting water further comprises flowing the water into the formation from an injection wellbore which extends substantially horizontally.

3. The method of claim 1, wherein the at least one valve comprises multiple valves, each valve being responsive to the water changing phase in a respective one of multiple intervals of the formation.

4. The method of claim 1, further comprising selecting a working fluid of the valve such that restriction to flow through the valve automatically increases when pressure and temperature in the formation are on a liquid phase side of a water saturation curve.

5. The method of claim 4, wherein the working fluid comprises an azeotrope.

6. The method of claim 1, wherein injecting the water further comprises flowing the water out of an injection wellbore, and wherein automatically decreasing resistance to flow through the valve further comprises flowing the steam into the valve in the production wellbore.

7. The method of claim 1, wherein decreasing resistance to flow through the valve further comprises rotating a closure member of the valve.

8. A geothermal well system, comprising:
   a tubular string disposed in a production wellbore, the tubular string including at least one valve;
   water which flows from an injection wellbore into a formation surrounding the injection wellbore, and then flows from the formation into the production wellbore as steam, and
   wherein resistance to flow through the valve decreases automatically in response to presence of the steam in the production wellbore.

9. The system of claim 8, wherein the valve comprises a working fluid which changes phase and thereby increases resistance to flow through the valve in response to pressure and temperature in the formation being on a liquid phase side of a water saturation curve.

10. The system of claim 9, wherein the working fluid comprises an azeotrope.

11. The system of claim 8, wherein at least one of the injection and production wellbores extends substantially horizontally.

12. The system of claim 8, wherein the at least one valve comprises multiple valves, each valve being responsive to presence of the steam in a respective one of multiple intervals of the formation.

13. The system of claim 8, wherein the valve includes a rotatably mounted closure member.

14. A method of geothermal energy production, the method comprising:
   injecting water into a subterranean formation from an injection wellbore;

the water changing phase in the formation; and then automatically decreasing resistance to fluid flow through at least one valve in response to presence of steam in a production wellbore, wherein the valve regulates flow between the formation and a tubular string in the production wellbore.

15. The method of claim 14, wherein the wellbore extends substantially horizontally.

16. The method of claim 14, wherein the at least one valve comprises multiple valves, each valve being responsive to the water changing phase in a respective one of multiple intervals of the formation.

17. The method of claim 14, further comprising selecting a working fluid of the valve such that resistance to flow through the valve automatically increases when pressure and temperature in the formation are on a liquid phase side of a water saturation curve.

18. The method of claim 17, wherein the working fluid comprises an azeotrope.

19. The method of claim 14, wherein opening the valve further comprises rotating a closure member of the valve.

* * * * *